(12) United States Patent
Nigmatullin et al.

(10) Patent No.: US 11,101,650 B2
(45) Date of Patent: Aug. 24, 2021

(54) SERIAL CONNECTION OF ADDITIONAL SOURCES OF DIRECT CURRENT TO EQUALIZE THE VOLTAGE IN A CIRCUIT WHEN THE LOAD IS INCREASED

(71) Applicants: Oleg Adgamovich Nigmatullin, Moscow (RU); Gennady Anisimovich Skosyrsky, Surgut (RU)

(72) Inventors: Oleg Adgamovich Nigmatullin, Moscow (RU); Gennady Anisimovich Skosyrsky, Surgut (RU)

( * ) Notice: Subject to any disclaimer, the term of this patent is extended or adjusted under 35 U.S.C. 154(b) by 0 days.

(21) Appl. No.: 16/867,987

(22) Filed: May 6, 2020

(65) Prior Publication Data

US 2021/0203156 A1 Jul. 1, 2021

(51) Int. Cl.
*H02J 1/14* (2006.01)
*H01M 10/42* (2006.01)

(52) U.S. Cl.
CPC ............. *H02J 1/14* (2013.01); *H01M 10/425* (2013.01); *H01M 2010/4271* (2013.01)

(58) Field of Classification Search
CPC . H02J 1/14; H01M 10/425; H01M 2010/4271
See application file for complete search history.

(56) References Cited

U.S. PATENT DOCUMENTS

| | | | | |
|---|---|---|---|---|
| 2014/0203639 | A1* | 7/2014 | Rozman | H02J 1/14 307/28 |
| 2017/0346283 | A1* | 11/2017 | Inam | H02J 7/35 |
| 2018/0254651 | A1* | 9/2018 | Hallmark | H01M 50/502 |
| 2020/0086744 | A1* | 3/2020 | Schumacher | H01M 10/4257 |
| 2020/0091737 | A1* | 3/2020 | Hallstrom | H02J 7/0068 |

* cited by examiner

*Primary Examiner* — Jared Fureman
*Assistant Examiner* — Duc M Pham
(74) *Attorney, Agent, or Firm* — Eversheds Sutherland (US) LLP

(57) ABSTRACT

Method for the serial connection of additional sources of direct current to equalize the voltage level in a system when the load is increased. It includes the following steps: by means of wires, a first load is plugged in between the positive and negative terminals of the original source of direct current, observing polarity. In addition, one of the wires, connected to the negative terminal of the original source of direct current is the common negative wire, while the second wire, connected to the positive terminal of the original source of direct current, is the common positive wire.

31 Claims, 4 Drawing Sheets

To source of direct current

To source of direct current

To source of direct current

To source of direct current

SERIAL CONNECTION OF ADDITIONAL SOURCES OF DIRECT CURRENT TO EQUALIZE THE VOLTAGE IN A CIRCUIT WHEN THE LOAD IS INCREASED

CROSS-REFERENCE TO RELATED APPLICATION(S)

This application claims the benefit under 35 U.S.C. 119 (a)-(d) and (f) of Russian Application No. 2019144406, filed Dec. 27, 2019, now Patent No. 936072, issued Apr. 29, 2020, the disclosure of which is incorporated herein by reference as if set forth in full.

TECHNICAL FIELD

The present invention relates to electrical engineering, more precisely, a method for the serial connection of additional sources of direct current to equalize the voltage in a circuit while increasing the load. The method may be used for supplying electricity to buildings and structures for residential, industrial and commercial purposes, including circuits for electrical lighting and powering machines, devices and electrical equipment.

BACKGROUND ART

With the development of industry and the improvement of the quality of life, the demand for electrical power is constantly increasing. This must be taken into account in planning for the normal functioning of the electrical system. Analysis has shown that significant factors affecting the demand for electrical power include the operating schedules of businesses, which leads to an increase in the load for household use and lighting. Attention should be given to the fact the consumption of electrical power is constrained. This is caused by several factors, especially the high cost of electrical power both for the population and for industrial plants. Moreover, when power from an alternating current system is used, there are risks that are dangerous for human life and health associated with the high voltage in a 220 V-280 V circuit, and also the effect of high frequency on the environment when the power is transmitted over electrical power lines. The use of alternating current for running industrial equipment and household devices leads to frequent power failures. Moreover, account should be taken of the risk of causing fires because of short circuits in an alternating current system.

Using alternating current sources, for example, in lighting systems, might rule out the disadvantages of using alternating current that are cited above. However, direct current sources have limited capacity and, in existing traditional layouts for plugging in a load, said sources have a limited lifetime. Moreover, large losses occur that prevent the power from the direct current sources from being used effectively. When a load is plugged into the direct current sources, problems arise linking to the heating up of the wire. As a result, there is a failure of the insulation and a fire from the heating and/or a short circuit. Therefore, a heavy-gauge wire must be used, which requires large economic and energy expenditures; moreover, large losses of power occur.

As sources of direct current, use may be made of accumulator cells. In most cases, accumulator cells are used in groups or battery arrays; the quantity of elements in the battery array depends of the requirements made by the operation. Two factors determine the choice of the layout for connecting the elements: the necessary level of load and the necessary capacity. When the elements are connected in series, the voltage of all the elements is added together, but the capacity of a battery array connected in series does not exceed the capacity of one element. If the elements are connected in parallel, then the voltage of the battery array is no greater than the voltage of one element, but the capacity of a battery array is equivalent to the sum of the capacities of the individual elements. In a mixed connection, the elements may be assembled in sequential rows and these rows are then connected in parallel. The parallel connection of groups of accumulator cells in series in used in cases when very large capacity is required.

The connection of batteries of accumulators is disclosed, for example, in RU 2579355 C2 (published on 10 Apr. 2016). An accumulator battery array is connected in a detachable manner with several accumulator battery arrays of one type to supply different electrical devices with the different power level required. Here, the accumulator battery array contains at least four terminal posts, of which two terminal posts correspond to two correspondingly arranged counter terminal posts of an adjacent accumulator battery array. The detachable connection of the adjacent battery arrays provides, at the least, by one swivel mount, that, in a certain position of the battery arrays in relation to one another, after a turn, it allows for the possibility of inserting them into the swivel mount or of removing them from it, at the time when, in the other limits of the turn, the battery arrays are held fast in the swivel mount. In the battery array, there is provided a high degree of stability for the contacts of the adjacent battery arrays and increased reliability while detachment is rapid and simple.

The connection of the battery arrangements as indicated does not provide any equalization of the amount of voltage in the direct current system when plugging in a load that exceeds the nominal power of the direct current source that is utilized. Also it does not increase the efficiency of the functioning of the direct current sources that are used in the battery array, when a load is plugged in.

In patent RU 2581615 C2 (published on 20 Apr. 2016), there is disclosed an accumulator battery array with a new design, which provides a balance of the voltage levels while maintaining high capacity. This battery array has a multiplicity of accumulator elements that are electrically joined to one another, which can be charged and discharged. Here, the accumulator battery array includes two or more types of accumulator groups having differing capacities or dimensions. In turn, each of the accumulator groups includes two or more accumulator elements having the same capacity or dimensions. The accumulator elements in each of the accumulator groups are connected to one another in series, and the accumulator elements between the accumulator groups are connected to one another in parallel.

The connection of accumulator battery arrays as indicated above does not provide any equalization of the voltage level in the direct current system when plugging in a load that exceeds the nominal power of the direct current source that is utilized. Also, it does not increase the efficiency of the functioning of the direct current sources that are used in the battery array, when a load is plugged in.

SUMMARY OF INVENTION

The object of the present invention is to create a method serial connection of additional direct current sources, whereby use is made of the principle of plugging in direct current sources among themselves and plugging in a load, which provides an equalization of the voltage levels in the direct current system when plugging in a load that exceeds the nominal power of the direct current source that is utilized, while increasing the efficiency of the functioning of the direct current sources when a load is hooked in.

The technical effect of the present invention consists in that it provides for an increase in the efficiency of the system in terms of equalizing the voltage level in the direct current system when plugging in a load that exceeds the nominal power of the direct current source that is utilized. It also increases the efficiency of the functioning of the direct current sources. In other words, the performance coefficient of the system that supplies the users. It also decreases losses of electrical power in the conductor and, as a result, it significantly increases the lifetime of the conductor itself and the insulation. This allows for the possibility of using a conductor with a smaller diameter at the same power rating of the load.

The technical effect is attained through creating a method for plugging in additional direct current sources to equalize the voltage levels in the system when the load is increased. This method consists in:

by means of wires, plugging in a first load B1 between the positive and negative terminals of the original direct current source, while respecting the polarities. Here, one of the wires indicated above, which is hooked into the negative terminal of the original direct current source is the common negative wire, while the other wire, hooked into the positive terminal of the direct current source is the common positive wire.

using a first additional direct current source to equalize the voltage levels in the system when plugging in a load that exceeds the nominal power of the direct current source that is utilized and plugging in the negative terminal of the first direct current source to the positive terminal of the original direct current source. Here, the original source and the first additional source of direct current form the first group of sources, where the negative terminal of the original direct current source and the positive terminal of the first additional direct current source are the outputs of the first group of sources that has been formed.

plugging in a second load B2 between the common positive and the common negative wires, while plugging in the positive terminal of the first formed group of sources to the common positive wire at the point of connection of the second load.

using a second additional direct current source to equalize the voltage levels in the system when plugging in a load that exceeds the utilized nominal power of the first group of sources, and plugging in the negative terminal of the second direct current source to the positive terminal of the first additional direct current source. Here, the original, the first and the second direct current sources form a second group of direct current sources, in which the negative terminal of the original direct current source and the positive terminal of the second additional direct current source are outputs of the second formed group of sources.

plugging in a third load B3 between the common positive and the common negative wires, in which the positive terminal of the second formed group is plugged into the common positive wire at the point of connection of the third load.

plugging in a K additional direct current source to equalize the voltage levels in the system when plugging in a load that exceeds the nominal power of the group of sources (K-1) that is utilized, and plugging the negative terminal of the K additional direct current source into the positive terminal (K-1) of the additional direct current source. Here, the original, the first, the second . . . and the K additional direct current sources form the K group of sources. In addition, the negative terminal of the of the original direct current source and the positive pole of the K additional direct current source are the outputs of the K formed group of sources.

plugging in an N load BN between the common positive and the common negative wires, while plugging in the positive terminal of the K formed group of direct current sources to the common positive wire at the point of connection of the N load.

Preferably, as the original and the additional direct current sources, accumulator battery arrays are used.

Preferably, direct current sources of the same nominal power are used.

Preferably, direct current sources of the same/differing voltage rating are used.

Preferably, as original and additional direct current sources, converters of direct current voltage into direct are used.

Preferably, the converters of direct current voltage into direct are hooked into an outside direct current source in parallel.

Preferably, the converters of direct current voltage into direct are hooked into an outside direct current source in series.

For this, by means of a wire, the negative input terminal of the original converter of direct current voltage into direct is connected to the negative contact of the outside direct current source, while the positive input terminal of the original converter of direct current voltage into direct is connected to the negative terminal of the additional converter of direct current voltage into direct.

Moreover, the input negative terminal of the original converter of direct current voltage into direct and the input positive terminal of the additional converter of direct current voltage into direct are the input terminals of the formed group of direct current sources.

Preferably, if the converter of direct current voltage are connected in series, the input positive terminal of the additional converter of direct current voltage into direct is connected into the input negative terminal of the M converter of direct current voltage into direct, while the input negative of the original converter of direct current voltage into direct and the input positive terminal of the M converter of direct current voltage into direct are the input terminals of the formed group of converters of direct current voltage into direct.

Preferably, direct current sources of the same nominal power are used.

Preferably, direct current sources of the same/differing voltage rating are used.

Preferably, as the original source and the additional sources of direct current, converters of alternating current voltage into direct are used.

Preferably, the converters of alternating current voltage into direct are connected into an outside source of alternating current in parallel.

Preferably, the converters of alternating current voltage into direct are connected into an outside source of alternating current in series.

Preferably, if the converters of alternating current voltage into direct are connected in series to the outside source of alternating current by means of a wire, the input terminal N is connected to the contact of the outside source of alternating current and terminal L of the original converter of alternating current voltage into direct is connected to terminal N of the additional converter of alternating current voltage into direct, while terminal N of the original converter of alternating current into direct and terminal L of the additional converter of alternating current into direct are input terminals of the formed group of direct current sources.

Preferably, if the converters of alternating current voltage into direct are connected in series, terminal L of the additional converter of alternating current into direct is connected to terminal N of the P converter of alternating current into direct. Here, terminal N of the original converter of alternating current voltage into direct and terminal L of the P converter of alternating current voltage into direct are the input terminals of the formed group of direct current sources.

Preferably, direct current sources of the same nominal power are used.

Preferably, direct current sources of the same/differing voltage rating are used.

Preferably, by means of wires, load B4 is connected between the positive and negative terminals of the first additional source of direct current. Here, one of the wires, which is connected to the negative terminal of the first additional direct current source, is the second common negative wire, while the second wire, which is connected to the positive terminal of the second additional direct current source, is the second common positive wire.

The second load B5 is connected between the second common positive wire and the second common negative wire. Here, to equalize the voltage level in the system when plugging in a load that exceeds the nominal power of the group of sources that is utilized, the positive terminal of the second additional source is connected to the common positive wire at the point of connection of the second load B5.

The N load is connected between the common positive wire and the common negative wire. Here, the positive terminal of the K formed group of sources is connected to the common positive terminal at the point of connection of the N load.

Preferably, additional sources of direct current are used with the same voltage rating and the same/differing nominal power and they are connected in parallel, at least, to one source of direct current.

The technical effect is also attained by creating a method for the serial connection of additional direct current sources to equalize the voltage level in the system when the load is increased. This method consists in:

connecting, by means of wires, the first load between the positive and negative wires terminals of the original source of direct current, while observing the polarities. Here, one of the above wires, which is connected to the positive terminal of the original direct current source, is the common positive wire, while the other wire, which is connected to the negative terminal of the original direct current source, is the common negative terminal.

the first additional direct current source is used to equalize the voltage level in the system when connecting in a load that exceeds the nominal power of the original direct current source that is utilized. Also the positive terminal of the first additional direct current source is connected to the negative terminal of the original direct current source. Here, the original and the additional direct current sources are the outputs of the first formed group of sources.

The second load is connected in between the common positive wire and the common negative wire. Here, the negative terminal of the first formed group of sources is connected to the common negative wire at the point of connection of the second load.

The second direct current source is used to equalize the voltage level in the system when connecting in a load that exceeds the utilized nominal power of the first group of sources. Also the positive terminal of the second additional direct current source is connected to the negative terminal of the first additional direct current source. Here, the original, the first and the second additional direct current sources form a second group of sources, where the positive terminal of the original direct current source and the negative terminal of the second additional direct current source are the outputs of the second formed group of sources.

The third load is connected in between the common positive wire and the common negative wire. Here, the negative terminal of the second formed group of sources is connected to the common negative at the point of connection of the third load.

The K additional direct current source is used to equalize the voltage level in the system when connecting in a load that exceeds the nominal power (K-1) of the group of sources that is utilized. Also the positive terminal of the K additional direct current source is connected to the negative terminal (K-1) of the additional direct current source. Here, the original, first, second . . . and K additional direct current sources form the K group of sources, in which the positive terminal of the original source of direct current and the negative terminal of the K additional source of direct current are the outputs of the K formed group of sources.

The N load is connected in between the common positive wire and the common negative wire, while the negative terminal of the K formed group of sources is connected to the common negative wire at the point of connection of the N load.

BRIEF DESCRIPTION OF DRAWINGS

Hereinafter, the invention is illustrated by a description of various preferred embodiments, with references to the accompanying drawings, in which.

DESCRIPTION OF EMBODIMENTS

Figure 1:
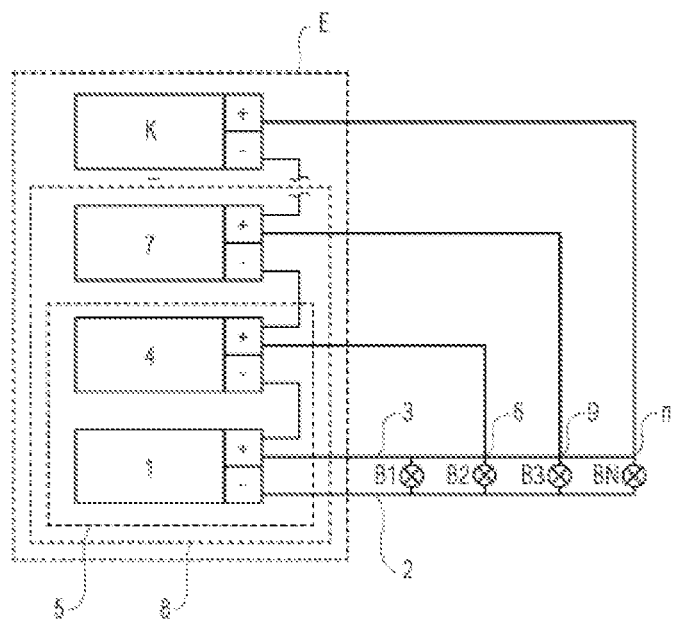
FIG. 1 shows a diagram for connecting additional sources of direct current to the original source of direct current. It also shows the design for connecting loads, where, as direct current sources, use is made of an accumulator battery array, the first embodiment.

A method for serial connection of additional sources of direct current to equalize the voltage level in a system when the load is increased, according to the invention, includes the steps that follow.

By means of wires, first load B1 (FIG. 1) is connected between the positive and negative terminals of original source 1 of direct current, while observing polarity, where one of wires 2, connected to the negative terminal of original source 1 of direct current is the common negative wire, while the other wire 3, connected to the positive terminal of original source 1 of direct current, is the common positive wire.

First additional source 4 of direct current is used to equalize the voltage level of the system when connecting load B2 that exceeds the utilized nominal power of original source 1 of direct current. Also the negative terminal of first additional source 4 of direct current is connected to the positive of the original source 1 of direct current. In addition, original 1 and first additional source 4 of direct current form the first group 5 of sources.

The second load B2 is connected between the common positive wire 3 and the common negative wire 2. In addition, the positive terminal of first formed group 5 is connected to common positive wire 3 at point 6 of connection of second load B2.

Second source 7 of direct current is used to equalize the voltage level in the system when connecting load B3 that exceeds the utilized nominal power of group 5 of sources. In addition, the negative terminal of second additional source 7 of direct current is connected to the positive terminal of first additional source 4 of direct current. In addition, original 1, first 4 and second 7 additional sources of direct current form second group 8 of sources. Here, the negative terminal of original source 1 of direct current and the positive terminal of second additional 7 source of direct current are the outputs of second formed group 8 of sources.

Third load B3 is connected between common positive wire 3 and common negative wire 2, while the positive terminal of second formed group 8 of sources is connected to common positive wire 3 at point 9 of connection of third load B3.

As loads B1, B2, B3, use may be made of an electrical lighting grid or a grid for supplying power to machines, devices and electrical equipment.

The K additional source of direct current is used to equalize the voltage level in a system when connecting load BN that exceeds the nominal power (E-1) of the group of sources that is utilized. The negative terminal of K additional source of direct current is connected to the positive terminal (K-1) of the additional source of direct current. In addition, original 1, first 4, second 7 . . . K additional sources of direct current form the E group of sources. Here, the negative terminal of original source 1 of direct current and the positive terminal of K additional source of direct current are the outputs of the E formed group of sources.

N load BN is connected between common positive wire 3 and common negative wire 2, while the positive terminal of the E formed group of sources is connected to common positive wire 3 at point n of connection of the N load BN.

FIG. 1 shows an embodiment, where, as each of the sources of direct current, the original 1 and additional sources 4, 7, . . . K, an accumulator battery array is used.

Preferably, direct current sources of the same nominal power are used.

Preferably, direct current sources of the same/differing voltage rating are used.

Another embodiment of the invention is possible, where, as each of the sources of direct current, the original and the additional sources, converters 10, 11, 12 . . . M of direct current voltage into direct are used (FIG. 2).

Figure 2:
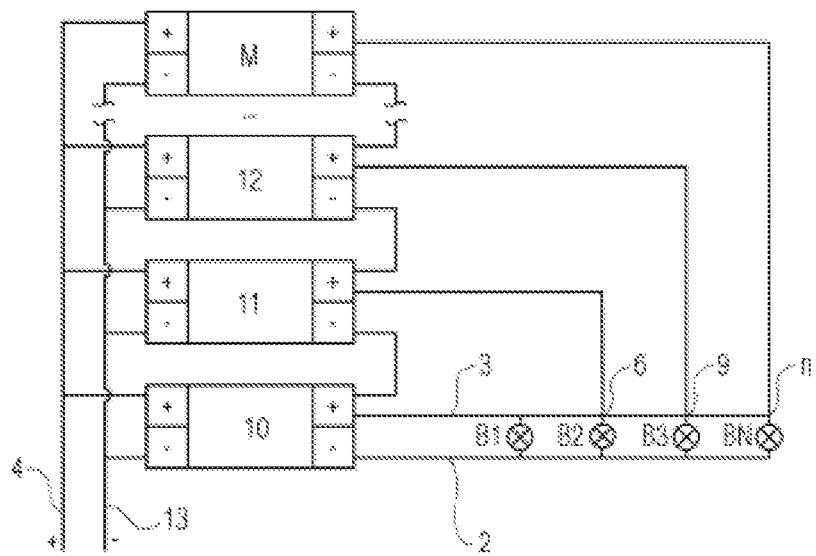
FIG. 2 shows a diagram for the parallel connection of the original direct current source and additional direct current sources to an outside source of direct current. It also shows the connection of loads, where, as sources of direct current, use is made of a converter of direct current into direct.

FIG. 2 shows a diagram of the parallel connection of converters 10, 11, 12 . . . M of direct current voltage into direct to an outside source of direct current (not shown).

Figure 3:
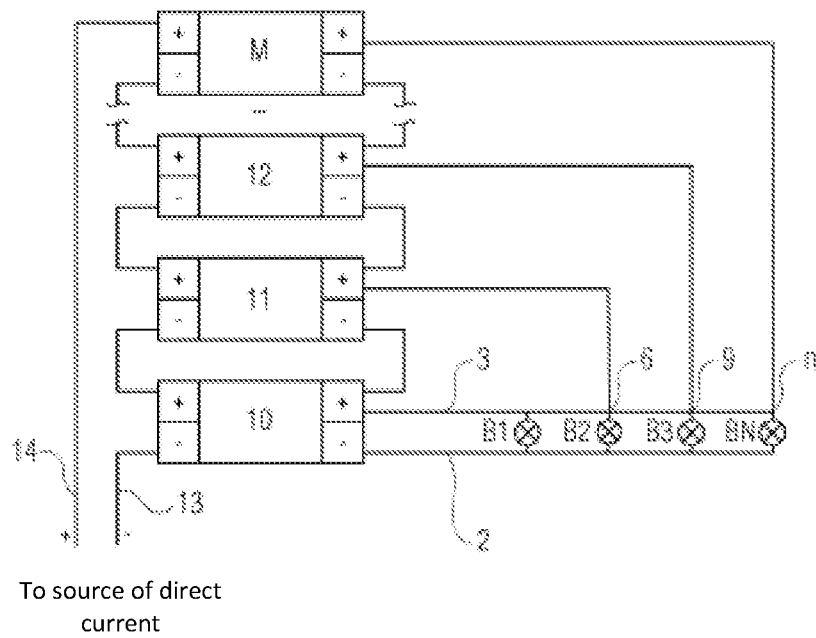
FIG. 3 shows a diagram for the serial connection of the original direct current source and additional direct current sources to an outside source of direct current. It also shows the connection of loads, where, as sources of direct current, use is made of a converter of direct current into direct.

FIG. 3 shows a diagram of the serial connection of converters 10, 11, 12 . . . M of direct current voltage into direct to an outside source of direct current (not shown).

In a serial connection, by means of wire 13, the negative input terminal of original converter 10 of direct current voltage into direct is connected to the negative contact of an outside source of direct current, while the positive input terminal of original converter 10 of direct current into direct is connected into input negative terminal of original converter 11 of direct current voltage into direct. In addition, the input negative terminal of original converter 10 of direct current voltage into direct and the input positive terminal of first additional converter 11 of direct current voltage into direct are the input terminals of the formed group of converters of direct current voltage into direct.

In a serial connection of the additional converters of direct current voltage into direct, the input positive terminal of additional converter of direct current voltage into direct is connected to input negative terminal of the M converter of direct current voltage into direct. In addition, the input negative terminal of original converter 10 of direct current voltage into direct and the input positive terminal of the M converter of direct current voltage into direct are the input terminals of the formed group of converters of direct current voltage into direct. Here, the input positive terminal of the M converter of direct current voltage into direct is connected, by means of wire 14, to the positive contact of the outside source of direct current voltage.

Preferably, direct current sources of the same nominal power are used.

Preferably, direct current sources of the same/differing voltage rating are used.

Figure 4:
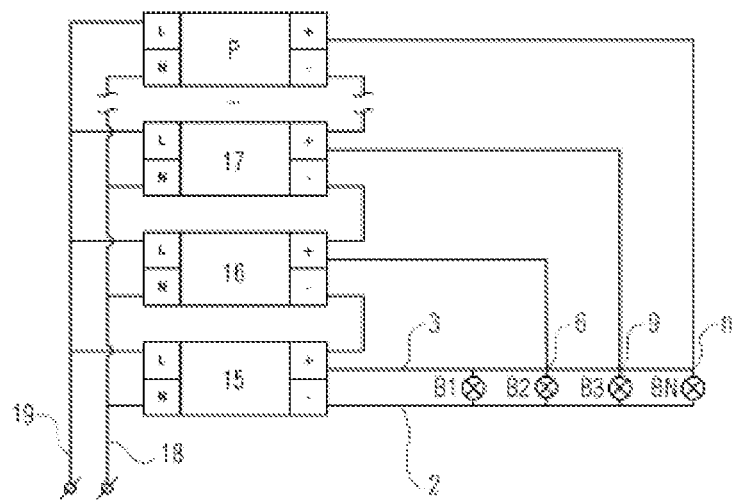
FIG. 4 shows a diagram for the parallel connection of the original direct current source and additional direct current sources to an outside source of alternating current. It also shows the connection of loads, where, as sources of direct current, use is made of a converter of alternating current into direct.
Figure 5:
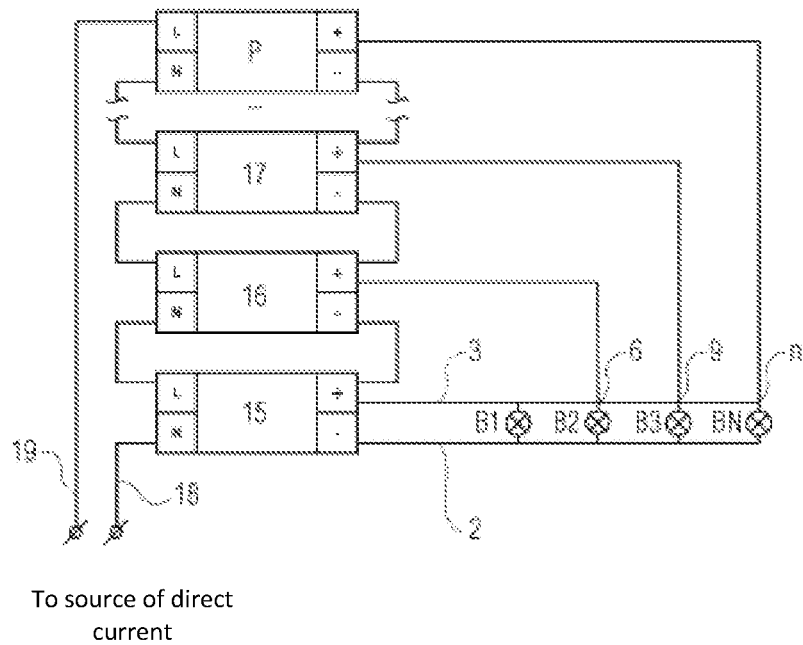
FIG. 5 shows a diagram for the serial connection of the original direct current source and additional direct current sources to an outside source of alternating current. It also shows the connection of loads, where, as sources of direct current, use is made of a converter of alternating current into direct.

Another embodiment of the invention is possible, where, as each of the sources of direct current, the original and the additional sources, converters 15, 16, 17 . . . P of alternating current into direct are used (FIG. 4). Here, these converters 15, 16, 17 . . . P of alternating current into direct are connected to a source of alternating current by means of wires 18, 19, either in parallel (FIG. 4) or in series (FIG. 5).

In a serial connection (FIG. 5) of converters 15, 16, 17 . . . P of alternating current into direct, by means of wire 18, terminal N of original converter 15 of alternating current voltage into direct is connected to a source of alternating current. Also terminal L of original converter 15 of alternating current into direct is connected to terminal N of additional converter 16 of alternating current voltage into direct. In addition, terminal N of the original converter of alternating current voltage into direct and terminal L of additional converter 16 of alternating current voltage into direct are the input terminals of the formed group of converters 15, 16 of alternating current voltage into direct.

In a serial connection (FIG. 5) of converters 15, 16, 17 . . . P of alternating current into direct, terminal L of additional (P-1) converter of alternating current voltage into direct is connected to terminal N of the P converter of alternating current voltage into direct. In addition, terminal N of original converter 15 of alternating current voltage into direct and terminal L of the P converter of alternating current voltage into direct are the input terminals of the formed group of converters of alternating current voltage into direct. Here, input terminal L of the P converter of alternating current voltage into direct, by means of wire 19, is connected to the outside source of alternating current voltage.

Preferably, direct current sources of the same nominal power are used.

Preferably, direct current sources of the same/differing voltage rating are used.

Another embodiment of the invention is possible, where sources of direct current 1, 4, 7, K, 10, 11, 12, M of the same nominal power are used, but they may be of a different voltage rating. In other words, source 1 may be 5 V; source 4 may be 10 V; source 10 may be 75 V, but having the same nominal power, for instance 200 watts. In other words, source 1 with a rating of 5 V will have 200 watts of power; source 4 with a rating of 10 V will have 200 watts of power; source 6 with a rating of 75 V will have 200 watts of power (FIG. 1, 2, 3).

According to another embodiment of the invention, direct current sources with the same voltage are used; for example, they may be of the same voltage rating. In other words, source 1 may be 5 V; source 4 may be 5 V; source 7 may be 5 V and have the same nominal power, 200 watts for example. In other words, source 1 having 5 V with 200 watts of power; source 4 having 5 V with 200 watts; source 7 with having 5 V with 200 watts of power (FIG. 1, 2, 3).

Figure 6:
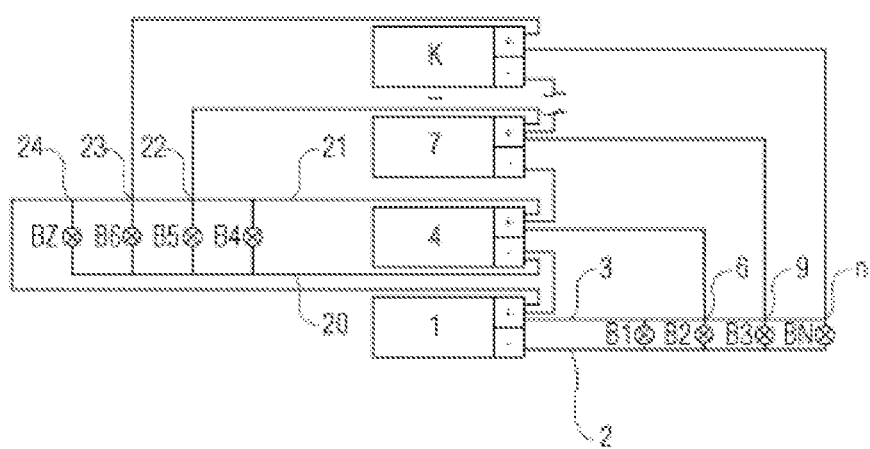
FIG. 6 shows a diagram for the connection of loads to the first additional source of direct current.

Another embodiment is possible, where additionally, by means of wires 20, 21, load B4 (FIG. 6) is connected between the positive and negative terminals of the first additional source 4 of direct current. Here, one of wires 20, connected to the negative terminal of first additional source 4 of direct current is the second common negative wire, while the other wire 21, connected to the positive terminal of first additional source 4 of direct current, is the second common positive wire.

Second load B5 is connected between second common positive wire 21 and second common negative wire 20. In addition, in order to equalize the voltage level when connecting load B5 that exceeds the utilized nominal power of first additional source 4 of direct current, the positive terminal of second additional source 7 is connected to common positive wire 21 at point 22 of the connection of second load B5.

Third load B6 is connected between second common positive wire 21 and second common negative wire 20. In addition, to equalize the voltage level in the system when connecting load B6 that exceeds the utilized nominal power of the second group of sources, the positive terminal of the K source is connected to common positive wire 21 at point 23 of the connection of second load B6.

The Z load is connected between common positive wire 21 and second common negative wire 20. In addition, the positive terminal of original source 1 of direct current is connected to common positive wire 21 at point 24 of the connection of the Z load.

In case it is necessary to increase the power rating, additional direct current sources with the same voltage rating are used that is equal to the voltage rating of the direct current source, to which the connection is made, and with the same or a differing nominal power. In addition, they are connected in parallel to at least one source 1, 4, 7, K, 10, 11, 12, M, 15, 16, 17, P source of direct current. If it is necessary to increase the power of the group of voltage converters, use is made of direct current sources of the same voltage rating, equal to the voltage rating of the direct current source to which the connection is made, and with the same or a different nominal power. For this, in the group, parallel to each converter, there are connected as many voltage converters as voltage converters of the same rating are required. For example, to 5 V is connected 5 V, while to 75 V is connected 75 V. Moreover, it is possible to connect voltage converters of differing power. For example, to original converter 1 (5 V, 200 watts), it is possible to connect in parallel voltage converters (necessarily 5 V but with differing power (200 watts or 300 watts or 50 watts). This is applicable to each source and converter in the group that is formed.

Another embodiment of the invention is also possible, whereby the method of the serial connection of additional sources of direct current to equalize the voltage level in the system when plugging in a load, is implemented in the following way.

Figure 7:
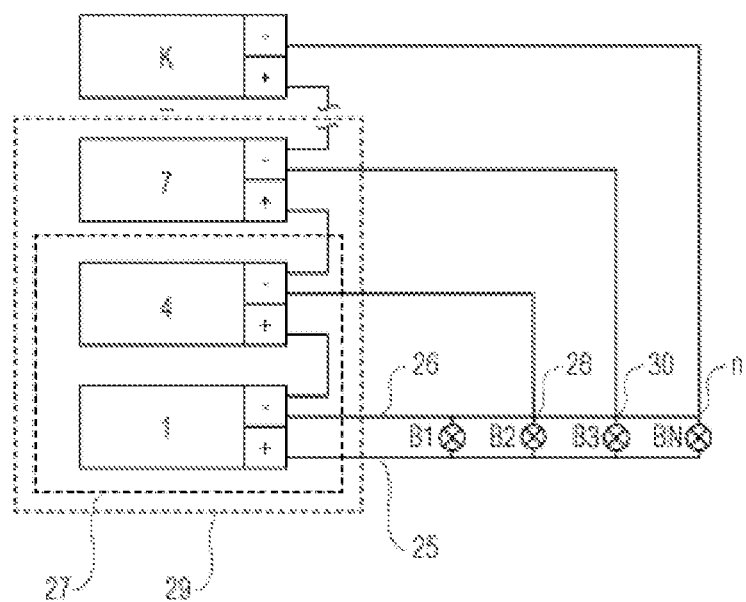
FIG. 7 shows a diagram for the connection of additional sources of direct current to the original source of direct current. It also shows a diagram for to connection of loads, where, as sources of direct current, used is made of an accumulator battery array, the second embodiment of the invention.

By means of wires, first load B1 (FIG. 7) is connected between the positive and the negative terminals of original source 1 of direct current, observing polarity. In addition, one of these wires 25, connected to the positive terminal of original source 1 of direct current, is the common positive wire, while the other wire 26, connected to the negative terminal of original source 1 of direct current is the common negative wire.

First additional source 4 of direct current is used to equalize the voltage level in the system when plugging in a load that exceeds the utilized nominal power. In addition, the positive terminal of first source 4 of direct current is connected to the negative terminal of original source 1 of direct current. Here, original source 1 and the additional sources of direct current form first group 27 of sources. The positive terminal of original source 1 of direct current and the negative terminal of first additional source 4 of direct current are the output terminals of first formed group 27 of sources.

Second load B2 is plugged in between common positive and common negative wires 25, 26. In addition, the negative terminal of first formed group 27 of sources is connected to common negative terminal 26 at point 28 of the connection of the second load B2.

Second additional source 7 of direct current is used to equalize the voltage level in the system when plugging in load B3 that exceeds the utilized nominal power of first group 27 of sources. In addition, the positive terminal of second additional source 7 of direct current is connected to the negative terminal of first additional source 4 of direct current. Here, original 1, first 4 and second 7 additional sources of direct current form a second group 29 of sources. Here, the positive terminal of original source 1 of direct current and the negative terminal of second additional source 7 of direct current are the output terminals of second formed group 29 of sources.

Third load B3 is plugged in between common positive wire 25 and common negative wire 26, while the negative terminal of second formed group 29 is connected to the common negative wire 26 at point 30 of the connection of third load B3.

The K additional source of direct current is used to equalize the voltage level in the system when plugging in a load that exceeds the utilized nominal power (K-1) of a group of sources. In addition, the positive terminal of the K additional source of direct current is connected to the negative terminal (K-1) of the additional source of direct current. Here, original 1, first 4, second 7 . . . and the K additional sources of direct current form the E group of sources. In addition, the positive terminal of the original source of direct current and the negative terminal of the K additional source of direct current are the outputs of the E formed group of sources. N load BN is plugged between common positive wire 25 and common negative wire 26, while the negative terminal of the E formed group of sources is connected to common negative wire 26 at point n of the connection of N load BN.

Although the preferred embodiments of the present invention are described for illustrative purposes, specialists in this technical field understand that are various possible modifications, additions and changes that do not deviate from the concept and do not go beyond the limits of the present invention, which are described in the accompanying patent claims.

The invention claimed is:

1. A method for the serial connection of additional sources of direct current to equalize the voltage level in a system when a load is increased, the method comprising:
    plugging in a first load B1 between a positive terminal and a negative terminal of an original direct current source using one or more wires, while respecting the polarities, wherein a first wire of the one or more wires is attached into a negative terminal of the original direct current source is a common negative wire, and wherein a second wire of the one or more wires is hooked into a positive terminal of the original direct current source is a common positive wire;
    using a first additional direct current source to equalize voltage levels when plugging in a load that exceeds a utilized nominal power of the original direct current source and plugging in the negative terminal of the first additional direct current source to the positive terminal of the original direct current source, wherein the original direct current source and the first additional direct current source form a first group of sources, wherein the negative terminal of the original direct current source and the positive terminal of the first additional direct current source are the outputs of the first group of sources;
    plugging in a second load B2 between the common positive wire and the common negative wire, while plugging in the positive terminal of the first formed group of sources to the common positive wire at a point of connection of the second load B2;
    using a second additional direct current source to equalize the voltage levels in the system when plugging in a load that exceeds the utilized nominal power of the first group of sources, and plugging in a negative terminal of the second direct current source to the positive terminal of the first additional direct current source, wherein the original direct current source, the first additional direct current source, and the second direct current source form a second group of direct current sources, in which the negative terminal of the original direct current source and the positive terminal of the second additional direct current source are outputs of the second formed group of sources;
    plugging in a third load B3 between the common positive wire and the common negative wire, in which the positive terminal of the second formed group is plugged into the common positive wire at the point of connection of the third load;
    plugging in a K additional direct current source to equalize the voltage levels in the system when plugging in a load that exceeds a nominal power of the group of sources (K-1) that is utilized, and plugging a negative terminal of the K additional direct current source into a positive terminal (K-1) of the additional direct current source, wherein the original direct current source, the first additional direct current source, the second direct current source, the K additional direct current sources form the K group of sources, and wherein the negative terminal of the original direct current source and a positive pole of the K additional direct current source are outputs of the K formed group of sources; and
    plugging in an N load BN between the common positive and the common negative wires, while plugging the positive terminal of the K formed group of direct current sources into a common positive wire at the point of connection of the N load.

2. The method of claim 1, wherein an accumulator battery array is used as the original and the additional sources of direct current.

3. The method of claim 2, wherein direct current sources of the same power rating are used, using the same or different voltage.

4. The method of claim 2, wherein direct current sources of the same power rating are used.

5. The method of claim 4, wherein direct current sources of the same/differing voltage rating are used.

6. The method of claim 2, wherein additional direct current sources with the same voltage rating, equal to the voltage rating of the original source of direct current, to which the connection is made, and with the same/differing power rating, and wherein these additional sources of direct current are connected in parallel to at least one source of direct current.

7. The method of claim 1, wherein as the original and the additional sources of direct current, converters of direct current voltage into direct are used.

8. The method of claim 7, wherein converters of direct voltage into direct are connected in parallel to a source of direct current.

9. The method of claim 7, wherein converters of direct voltage into direct are connected in series to a source of direct current, wherein, by means of a wire, the negative input terminal of the original converter of direct current voltage into direct is connected to the negative contact of the outside direct current source, while a positive input terminal of an original converter of direct current voltage into direct is connected to a negative input terminal of an additional converter of direct current voltage into direct, and wherein an input negative terminal of the original converter of direct current voltage into direct and the input positive terminal of the additional converter of direct current voltage into direct are input terminals of the formed group of direct current sources.

10. The method of claim 9, wherein in a serial connection of the converters of direct current voltage into direct, the input positive terminal of additional converter of direct current voltage into direct is connected to the input negative terminal of the M converter of direct current voltage into direct, wherein the input negative terminal of the original converter of direct current voltage into direct and the input positive terminal of the M converter of direct current voltage into direct are the input terminals of the formed group of converters of direct current voltage into direct, and wherein the input positive terminal of the M converter of direct current voltage into direct is connected, by means of a wire, to the positive contact of the outside source of direct current voltage.

11. The method of claim 7, wherein direct current sources of the same power rating are used, using the same or different voltage.

12. The method of claim 7, wherein direct current sources of the same power rating are used.

13. The method of claim 12, wherein direct current sources of the same/differing voltage rating are used.

14. The method of claim 7, wherein additional direct current sources with the same voltage rating, equal to the voltage rating of the original source of direct current, to which the connection is made, and with the same/differing power rating, and wherein these additional sources of direct current are connected in parallel to at least one source of direct current.

15. The method of claim 1, wherein, as the original and the additional sources of direct current, converters of alternating current into direct are used.

16. The method of claim 15, wherein direct current sources of the same power rating are used, using the same or different voltage.

17. The method of claim 15, wherein converters of alternating current into direct are connected in parallel to an outside source of alternating current.

18. The method of claim 15, wherein converters of alternating current into direct are connected in series to an outside source of alternating current.

19. The method of claim 18, wherein, in a serial connection of converters of alternating current voltage into direct, by means of a wire, terminal N of the original converter of alternating current voltage into direct is connected to a source of alternating current, wherein terminal L of the original converter of alternating current voltage into direct is connected to terminal N of the additional converter of alternating current voltage into direct, and wherein terminal N of the original converter of alternating current voltage into direct and terminal L of the additional converter of alternating current voltage into direct are the input terminals of the form group of sources of direct current.

20. The method of claim 18, wherein if the converters of alternating current voltage into direct are connected in series, terminal L of the additional converter of alternating current into direct is connected to terminal N of the P converter of alternating current into direct, wherein terminal N of the original converter of alternating current voltage into direct and terminal L of the P converter of alternating current voltage into direct are the input terminals of the formed group of direct current sources, and wherein input terminal L of the P converter of alternating current voltage into direct, by means of a wire, is connected to the outside source of alternating current voltage.

21. The method of claim 15, wherein direct current sources of the same power rating are used.

22. The method of claim 21, wherein direct current sources of the same/differing voltage rating are used.

23. The method of claim 15, wherein additional direct current sources with the same voltage rating, equal to the voltage rating of the original source of direct current, to which the connection is made, and with the same/differing power rating, and wherein these additional sources of direct current are connected in parallel to at least one source of direct current.

24. The method of claim 1, wherein direct current sources of the same power rating are used.

25. The method of claim 24, wherein direct current sources of the same/differing voltage rating are used.

26. The method of claim 1, wherein:
a load B4, by means of wires, is connected between the positive and negative terminals of the first additional source of direct current, wherein one of the wires, which is connected to the negative terminal of the first additional direct current source, is the second common negative wire, while the second wire, which is connected to the positive terminal of the second additional direct current source, is the second common positive wire,
a load B5 is connected between the second common positive wire and the second common negative wire, wherein to equalize the voltage level in the system when plugging in a load that exceeds the nominal power of the group of sources that is utilized, the positive terminal of the second additional source is connected to the common positive wire at the point of connection of the second load B5,
a load B6 is connected between the second common positive wire and the second common negative wire, wherein to equalize the voltage level in the system when connecting load B6 that exceeds the utilized nominal power of the second group of sources, the positive terminal of the K source is connected to the common positive wire at the point of the connection of third load B6, and
the N load is connected between the common positive wire and the common negative wire, wherein the positive terminal of the original source is connected to the common positive terminal at the point of connection of the N load.

27. The method of claim 1, wherein for the serial connection of additional direct current sources to equalize the voltage level in a system when the load is increasing, and the method further comprising:
by means of wires, plugging in the first load B1 between the positive and negative terminals of the original direct current source, while respecting the polarity, wherein one of the wires indicated above, which is plugged into the positive terminal of the original direct current source is the common positive wire, while the other wire, plugged into the negative terminal of the direct current source is the common negative wire;
using a first additional direct current source to equalize the voltage levels in the system when plugging in a load that exceeds the utilized nominal power of the direct current source and plugging the positive terminal of the first direct current source to the negative terminal of the original direct current source, here, the original source and the first additional source of direct current form the first group of sources, where the positive terminal of the original direct current source and the negative terminal of the first additional direct current source are the outputs of the first group of sources that has been formed;
plugging in a second load B2 between the common positive and the common negative wires, while plugging the negative terminal of the first formed group of sources into the common negative wire at the point of connection of the second load;

using a second additional direct current source to equalize the voltage levels in the system when plugging in a load that exceeds the utilized nominal power of the first group of sources, and plugging the positive terminal of the second direct current source into the negative terminal of the first additional direct current source, here, the original, the first and the second direct current sources form a second group of direct current sources, in which the positive terminal of the original direct current source and the negative terminal of the second additional direct current source are outputs of the second formed group of sources;

plugging in a third load B3 between the common positive and the common negative wires, in which the negative terminal of the second formed group is plugged into the common negative wire at the point of connection of the third load;

plugging in a K additional direct current source to equalize the voltage levels in the system when plugging in a load that exceeds the nominal power of the group of sources (K-1) that is utilized, and plugging the positive terminal of the K additional direct current source into the negative terminal (K-1) of the additional direct current source, here, the original, the first, the second . . . and the K additional direct current sources form the K group of sources, in addition, the positive terminal of the original direct current source and the negative terminal of the K additional direct current source are the outputs of the K formed group of sources; and plugging in an N load BN between the common positive and the common negative wires, while plugging the negative terminal of the K formed group of direct current sources into the common negative wire at the point of connection of the N load.

28. The method of claim 1, wherein additional direct current sources with the same voltage rating, equal to the voltage rating of the original source of direct current, to which the connection is made, and with the same/differing power rating, and wherein these additional sources of direct current are connected in parallel to at least one source of direct current.

29. A system for the serial connection of additional sources of direct current to equalize the voltage level in the system when a load is increased, the system comprising:
at least one memory that stores computer-executable instructions;
at least one display; and
at least one processor configured to access the at least one memory and execute the computer-executable instructions to:
plug in a first load B1 between a positive terminal and a negative terminal of an original direct current source using one or more wires, while respecting the polarities, wherein a first wire of the one or more wires is attached into a negative terminal of the original direct current source is a common negative wire, and wherein a second wire of the one or more wires is hooked into a positive terminal of the original direct current source is a common positive wire;

use a first additional direct current source to equalize voltage levels when plugging in a load that exceeds a utilized nominal power of the original direct current source and plugging in the negative terminal of the first additional direct current source to the positive terminal of the original direct current source, wherein the original direct current source and the first additional direct current source form a first group of sources, wherein the negative terminal of the original direct current source and the positive terminal of the first additional direct current source are the outputs of the first group of sources;

plug in a second load B2 between the common positive wire and the common negative wire, while plugging in the positive terminal of the first formed group of sources to the common positive wire at a point of connection of the second load B2;

use a second additional direct current source to equalize the voltage levels in the system when plugging in a load that exceeds the utilized nominal power of the first group of sources, and plugging in a negative terminal of the second direct current source to the positive terminal of the first additional direct current source, wherein the original direct current source, the first additional direct current source, and the second direct current source form a second group of direct current sources, in which the negative terminal of the original direct current source and the positive terminal of the second additional direct current source are outputs of the second formed group of sources;

plug in a third load B3 between the common positive wire and the common negative wire, in which the positive terminal of the second formed group is plugged into the common positive wire at the point of connection of the third load;

plug in a K additional direct current source to equalize the voltage levels in the system when plugging in a load that exceeds a nominal power of the group of sources (K-1) that is utilized, and plugging a negative terminal of the K additional direct current source into a positive terminal (K-1) of the additional direct current source, wherein the original direct current source, the first additional direct current source, the second direct current source, and the K additional direct current sources form the K group of sources, and wherein the negative terminal of the original direct current source and a positive pole of the K additional direct current source are outputs of the K formed group of sources; and plug in an N load BN between the common positive and the common negative wires, while plugging the positive terminal of the K formed group of direct current sources into a common positive wire at the point of connection of the N load.

30. The system of claim 29, wherein an accumulator battery array is used as the original and the additional sources of direct current.

31. The system of claim 29, wherein as the original and the additional sources of direct current, converters of direct current voltage into direct are used.

* * * * *